(12) United States Patent
Hohn et al.

(10) Patent No.: US 8,638,052 B2
(45) Date of Patent: Jan. 28, 2014

(54) METHOD AND CONTROL SYSTEM FOR CONTROLLING A SYNCHRONOUS ELECTRIC MACHINE

(75) Inventors: Harry Hohn, Oberhausen (DE); Lars Lay, Tutzing (DE); Jens Biebach, Tutzing (DE)

(73) Assignee: L-3 Communications Magnet-Motor GmbH, Starnberg (DE)

( * ) Notice: Subject to any disclaimer, the term of this patent is extended or adjusted under 35 U.S.C. 154(b) by 827 days.

(21) Appl. No.: 12/680,458

(22) PCT Filed: Sep. 26, 2008

(86) PCT No.: PCT/EP2008/008229
§ 371 (c)(1),
(2), (4) Date: Jul. 23, 2010

(87) PCT Pub. No.: WO2009/043556
PCT Pub. Date: Apr. 9, 2009

(65) Prior Publication Data
US 2010/0308759 A1    Dec. 9, 2010

(30) Foreign Application Priority Data
Sep. 27, 2007  (DE) .................. 10 2007 046 289

(51) Int. Cl.
*H02P 1/04* (2006.01)
(52) U.S. Cl.
USPC ............ 318/400.09; 318/400.02; 318/400.04; 318/400.15
(58) Field of Classification Search
USPC ............. 318/400.09, 400.02, 400.04, 400.06, 318/400.11, 400.15, 400.26, 400.34, 318/400.38, 362, 718, 719, 703
See application file for complete search history.

(56) References Cited

U.S. PATENT DOCUMENTS 5,010,283 A * 4/1991 Kitajima et al. .............. 318/373
5,057,760 A * 10/1991 Dadpey et al. ................ 318/807
6,002,225 A * 12/1999 Gleim et al. .................. 318/373

(Continued)

FOREIGN PATENT DOCUMENTS

| EP | 1555748  | 7/2005 |
| JP | 06253404 | 9/1994 |
| JP | 08009680 | 1/1996 |
| JP | 08080086 | 3/1996 |

OTHER PUBLICATIONS

Written Opinion and International Search Report for Application No. PCT/EP2008/008229, 6 pages.

(Continued)

*Primary Examiner* — Bentsu Ro
*Assistant Examiner* — Thai Dinh
(74) *Attorney, Agent, or Firm* — Faegre Baker Daniels LLP (57) ABSTRACT

A method of controlling an electric synchronous machine having a stator and a moving part includes operating the machine with a deceleration moment so that a speed of the moving part of the machine is reducing, monitoring the movement of the moving part of the machine, and, upon detection of a direction reversal or a speed of the moving part of approximately zero, transitioning to a holding mode by impressing at least one current pattern of string currents in the stator of the machine. The method also includes maintaining the current pattern until a stable equilibrium of moments between the external moment and a braking moment of the machine is established.

17 Claims, 4 Drawing Sheets

(56) References Cited

U.S. PATENT DOCUMENTS

| | | | |
|---|---|---|---|
| 6,124,645 A | 9/2000 | Jones | |
| 6,452,352 B1 * | 9/2002 | Farkas | 318/433 |
| 6,825,624 B2 * | 11/2004 | Anwar et al. | 318/432 |
| 6,831,432 B2 * | 12/2004 | Murakami | 318/362 |
| 2002/0163319 A1 * | 11/2002 | Kaneko et al. | 318/727 |
| 2004/0178754 A1 | 9/2004 | Anwar et al. | |
| 2005/0156555 A1 * | 7/2005 | Iwashita et al. | 318/719 |

OTHER PUBLICATIONS

Synchron-Vollpolmachine ohne Dampferwicklung, Steuerbedingungen ED—Schroder; Dirk, Jan. 1, 1995, Elektrische Antriebe 2, Regelung Von Antrieben, Springer, pp. 530-571, EPO 2004/17.

* cited by examiner

Fig. 1

Fig. 2c
Ex: vehicle standing downhill with brake operated

Fig. 2b
Ex: vehicle standing uphill with brake operated

METHOD AND CONTROL SYSTEM FOR CONTROLLING A SYNCHRONOUS ELECTRIC MACHINE

CROSS-REFERENCE TO RELATED APPLICATION:

This application is a National Stage filing of International Application Serial No. PCT/EP2008/008229, filed Sep. 26, 2008, which claims the benefit of German Application Serial No. 10 2007 046 289.3, filed Sep. 27, 2007, the disclosures of which are expressly incorporated herein by reference.

The present invention relates to a method of controlling an electric synchronous machine and to a control system for controlling an electric synchronous machine having a control means adapted to be connected to an electric supply means for supplying current to an electric stator system. In addition thereto, the invention relates to a vehicle comprising at least one electric synchronous machine for powering the vehicle and comprising such a control system, as well as to a computer program product suitable for performing such a method.

A synchronous machine and a system for controlling such a synchronous machine are used e.g. in an electric vehicle. In this regard, an electric vehicle is to be understood as a means of movement or a means of transportation in which the driving moment or torque is provided via the magnetic field of one or more three-phase synchronous motors (rotating or linear design) and is transferred mechanically to the area above which the movement takes place. It is usual in this respect that the electric machine issues the moment either directly (wheel hub motor without transmission system, linear motor) or via an upstream transmission system (wheel hub motor with transmission system, central motor with various kinds of transmission systems for torque transfer).

As regards means of movement, the demand of a specific positive moment or negative moment is characteristic, depending on the demanded acceleration or deceleration (negative acceleration). If the vehicle is to be accelerated, the positive moment is selected such that a target speed is reached within a desired period of time. The setting of the value of the positive moment is effected e.g. by means of the accelerator pedal. If a deceleration is desired, the command for a negative moment is issued. This command can be set e.g. by means of the brake pedal.

When the moments or torques are transferred in several locations to the area above which the movement takes place, the individual moments are to be selected such that a stable state of the vehicle is supported. This means that attempts are made for preventing gear moments. For preventing gear moments, the moment introduction is effected in the normal case symmetrically to the longitudinal axis of the vehicle. This is the case e.g. in vehicles in which like wheel torque amounts are effective for each axle in the same driving direction.

To permit the three-phase synchronous machine to unfold its full momentum, frequency and phase position of the supplying current must be in correspondence with the pole frequency and pole position of the rotor or moving part. For providing a synchronous three-phase current system with correct phase position, there is used e.g. an electronic converter on the basis of power semiconductors. For a three-phase current synchronous machine in synchronous operation under linear system conditions, there is direct proportionality between the current impressed and the moment reached. This proportionality is utilized for realizing equal moments on motors of one axle by means of the same current setting. For an accurate moment setting, a fast current controller is necessary. This current controller may be subordinated to additional control means, e.g. a speed regulating system.

The need for moment symmetry is not only present during acceleration of the vehicle, but also during braking. During braking, a moment is developed that is opposite to the present moving direction of vehicle and machine, with the kinetic energy of vehicle and machine being transformed into electrical energy. This deceleration has the effect that the machine reaches the speed zero. At that moment of time, the moment has to be allotted such that it fully compensates the external forces of the vehicle.

Speed regulation in many cases is not optimum. Speed regulation usually has a current regulation subordinated thereto so that all wheels establish a constant moment in accordance with the brake pedal setting. Wheels located on loose ground may thus slip, while wheels located on firm ground are still rolling. Matching the braking force to the ground is difficult to achieve. Moreover, it is problematic to select the amplification parameters of the speed controller, as these are dependent e.g. upon such factors like mass of the vehicle, which varies in accordance with the state of loading of the same, coefficient of adhesion, which is dependent on the current ground and the tires chosen, position of the wheels in the front or rear vehicle portion as well as the downhill grade and the uphill grade of the road, respectively. If a transmission system with characteristic slackness is present between the machine and the point of moment application, there is the risk that the tooth flanks may be damaged by the severe load changes of the transmission system.

It is the object of the present invention to indicate a method of controlling an electric synchronous machine and a corresponding control system that is suitable of keeping a driven vehicle at a standstill substantially without oscillating movements.

This object is met by a method of controlling an electric synchronous machine according to claim 1 and by a control system for controlling an electric synchronous machine according to claim 12. In addition thereto, the invention relates to a vehicle comprising at least one electric synchronous machine for powering the vehicle and comprising such a control system in accordance with the features of claim 13, as well as to a computer program product according to claim 14, having software code sections suitable for implementing such a control method when these are stored in a control system for controlling an electric synchronous machine. The computer program product may also be substituted by a connection-programmed circuit according to claim 15 of the same functionality.

In particular, the invention relates to a method of controlling an electric synchronous machine comprising a stator and a moving part, said method comprising the following steps: the machine is operated with a deceleration moment so that a moving part speed of the machine is reduced, and the moving part movement of the machine is monitored. Upon detection of a direction reversal or a moving part speed of approximately zero, a transition to a holding mode is effected, setting at least one electric supply variable of an electric stator system of the machine such that, at the beginning of the holding mode, an effective internal moment of the machine is formed that is reduced with respect to the deceleration moment. The electric supply variable is set in this manner until, with movement of the moving part and influence of an external moment acting on the machine, a stable equilibrium of moments between external moment and internal moment of the machine is established.

According to the invention, one thus obtains a standstill control of synchronous electric machines in rotating or linear design in which, after deceleration with a regulated moment or regulated force, so that the speed zero is reached, switching over to a specific holding mode is effected in which a stable equilibrium of moments or forces is reached at the point of intersection of two characteristic moment force lines, so that the vehicle remains at a standstill despite external forces.

The aim in this regard consists in providing a resistance to the vehicle after reversal of the moving direction, said resistance increasing as the distance covered increases. A state is then reached without control or regulating manipulations in which accelerating and braking moments are in equilibrium and the vehicle rests at a standstill.

In particular, in the holding mode, a phase position of the electric supply variable is kept substantially constant with respect to the stator system. In an embodiment, the electric supply variable is adjusted such that, at the beginning of the holding mode, an effective internal moment of the machine becomes approximately zero.

The phase position and the amount of the electric supply variable may be adjusted in defined manner by a moving part position of the machine that is valid during the direction reversal or the speed zero, respectively, and by a deceleration moment setting.

For example, as electric supply variable, a current pattern is impressed in the stator of the machine, in particular a pattern of substantially constant string currents. The current pattern according to an embodiment constitutes a current vector in a space vector representation, which at the beginning of the holding mode is impressed such that a phase position of the current vector of approximately −90° electrical in relation to the direction of movement of the space vector of the induced moving part voltage is obtained after standstill and thus is trailing (late ignition).

Additional advantageous embodiments and developments of the invention are indicated in the dependent claims.

The invention will be explained in more detail hereinafter by way of the figures shown in the drawings, in which.

Figure 1:
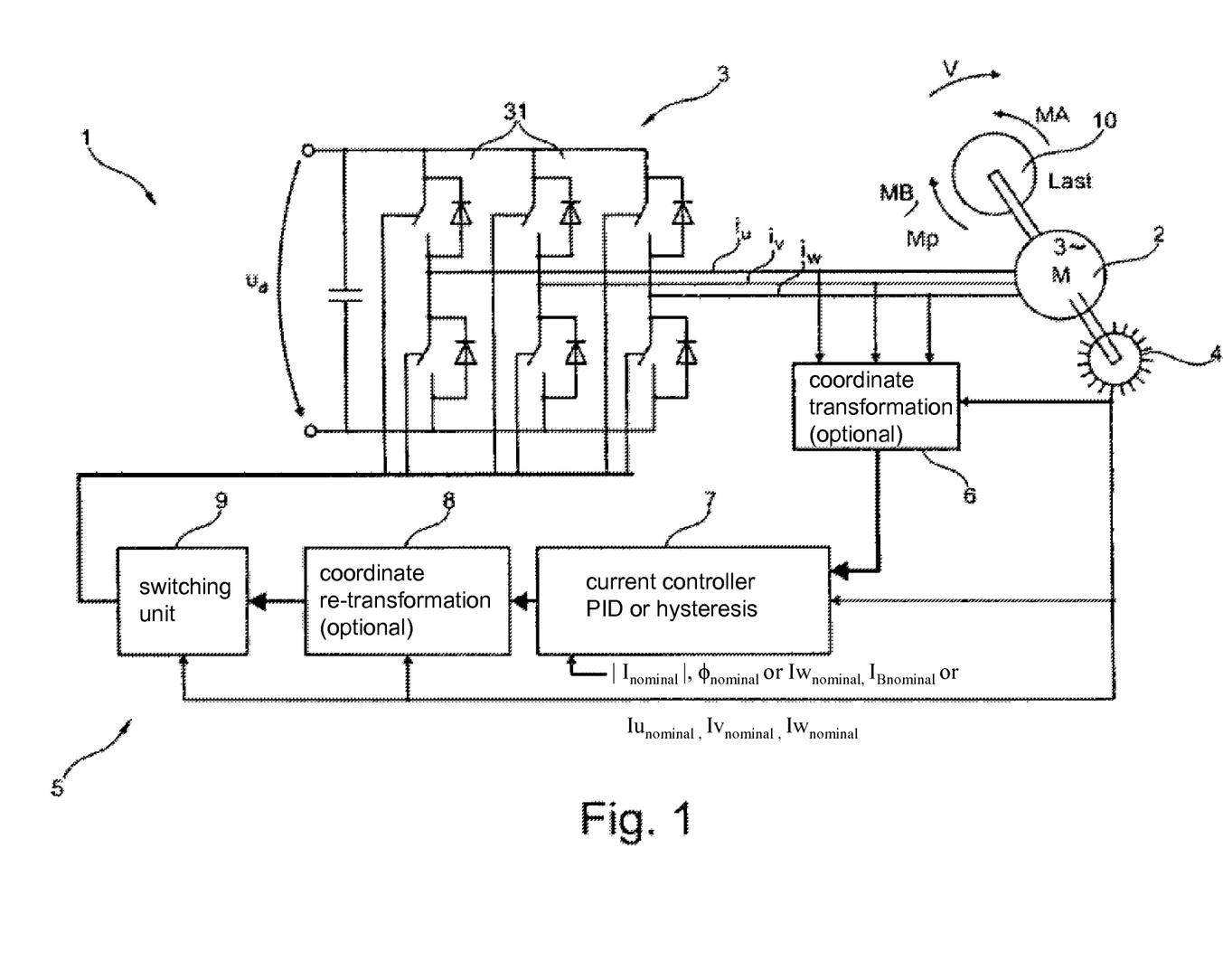
FIG. 1 is a schematic illustration of a drive system comprising an electric synchronous machine in the form of a an induction machine that is controlled and fed by a control system having an converter.

FIG. 1 is a schematic illustration of a drive system comprising an electric synchronous machine in the form of an induction machine 2 that is controlled and fed by a control system 1 having an converter 3. The following considerations with respect to the control of the induction machine 2 hold analogously also for a control of a synchronous machine in linear design in which stator and moving part are designed accordingly as linear stator and moving part, respectively.

The converter 3 in known manner is designed as a voltage intermediate circuit converter with intermediate circuit voltage Ud, while other converter types basically may be used as well. The converter 3 is controlled by a switching unit 9 driving the flux control valves 31 of converter 3 in accordance with the control setting, i.e. opens and, respectively, closes the same accordingly. A load 10 acts on the moving part of the machine 2, e.g. via an axle of a vehicle.

It is known that induction machines may be controlled both in rotor and in stator coordinates. Control of the current in stator coordinates has the advantage that no coordinate transformation has to be carried out. The actual current values are transferred to the current controller 7 as measured. Due to the fact that target or nominal and actual values each are dynamic alternating quantities, high demands are made on controller 7. The use of a linear PI controller is not possible due to the alternating quantities. However, it is possible to realize high-quality controls in stator coordinates by using non-linear hysteresis controllers. A possibly necessary coordinate transformation and coordinate re-transformation is performed in a corresponding coordinate transformation means 6 and coordinate re-transformation means 8, respectively.

If the sinusoidal stator currents are transformed into the rotor coordinate system, they may be treated as identical magnitudes, separated by active and reactive components (Cartesian coordinates). These coordinates can also be transformed into polar coordinates so that the stator current I is described by the quantity of its vector and the associated phase angle $\phi$. By way of the adequate identical magnitudes as target or nominal value (Iw, with w designating the active component, and Ib, with b designating the reactive component, or |I| and $\phi$) linear control can be realized in the current controller 7 with P-, I- and possibly also D-components.

The utilization of the specific properties of the synchronous machine permits the realization of a standstill/holding function that can make do without position or speed controller. The synchronous machine develops the maximum moment when the magnetic field of excitation and the electric current form an angle of 90°. The induced voltage $U_{EMK}$ and the phase current then have a mutual phase angle of 0° electrically (motor mode) or 180° electrically (generator mode).

For establishing synchronism between the exciting field and the current in the stator winding, there is used a position indicator 4 in the present case, by means of which the supplying converter 3 can be synchronized to the machine 2 in motion. This sensor should have the property of an absolute position indicator. These requirements are met by a resolver system. The resolver frequently is arranged such that it delivers the angle signal zero at the location of the voltage amplitude of phase U.

If the first derivation of the position signal is formed in accordance with time, the speed v results with which the rotor of the machine 2 rotates. For recognizing the standstill, the change in sign of the speed v may be used. A dynamically higher-quality recognition of the standstill is possible when the change in direction between forward and reverse counting of the resolver is evaluated. Resolver evaluation circuits to this end partly provide information on the direction of rotation using a specific output channel.

Realization in polar rotor coordinates:

FIGS. 2 and 3 show a system with induced voltage and stator current in rotor coordinate representation. As the system moves together with the rotor, both electric variables are fixed. It is assumed first that the rotor moves in a positive direction of rotation and a braking moment $M_B$ (internal moment of the machine) opposes this direction of movement so that the machine operates as a generator.

As electric supply variable in the present embodiment, a current pattern with stator currents $i_u, i_v, i_w$ is impressed in the three substantially symmetric phases u, v, w in the stator of the machine 2 (cp. FIG. 1 in connection with FIG. 4), which together constitute an overall stator current I in known space vector representation with an amplitude and a phase position as shown in FIGS. 2 and 3.

In particular, the current pattern forms a current vector I in a space vector representation in the so-called fixed-rotor DQ coordinate system, which at the beginning of the holding mode is impressed such that a phase position of the current vector I of approximately −90° electrical in relation to the direction of movement of the space vector of the induced moving part voltage $U_{EMK}$ is obtained after standstill and is thus trailing (late ignition).

The phase angle indicates the presently existing difference between the position delivered by the resolver and characterizing the present position of the moving part, and the stator current vector I. Due to the fact that the current I together with the induced voltage $U_{EMK}$ defines the output of the machine, the angle is often related to the induced voltage $U_{EMK}$. When the resolver, in case of a positive direction of rotation, is positioned in phase with the induced voltage $U_{EMK}$, a phase shift by 180° takes place in case of reversal of the direction of rotation.

Figure 2A:
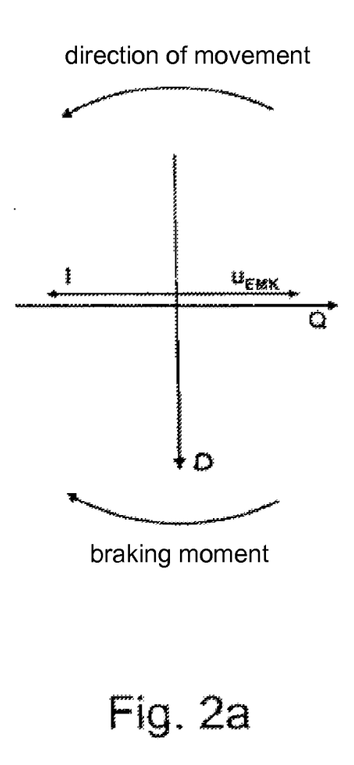
FIG. 2 is a schematic illustration of electric variables in a locking mode according to the invention, as generated by the induction machine or control system according to FIG. 1, in a space vector representation.

It is to be assumed first that the vehicle is in the course of a braking operation and the direction of movement is mathematically positive, i.e. counterclockwise (FIG. 2a). Due to the fact that the current vector I is in direct opposition (180° phase shift) to the induced voltage $U_{EMK}$, the machine develops the maximum possible moment $M_P$ possible with this current amount. By operating the brake pedal, the driver can determine the amount of the current vector and thus the intensity of the deceleration. It is assumed that the vehicle is immediately before standstill. In the rotor coordinate system, the current vector does not change its position. If the working point necessitates operation with field weakening, the active current has a reactive current component superimposed thereon, which is leading with respect to the voltage induced (early ignition). The current resulting from vectorial superimposition of active and reactive current remains in its position with respect to the voltage induced as long as this degree of field weakening is maintained.

Figure 2B:
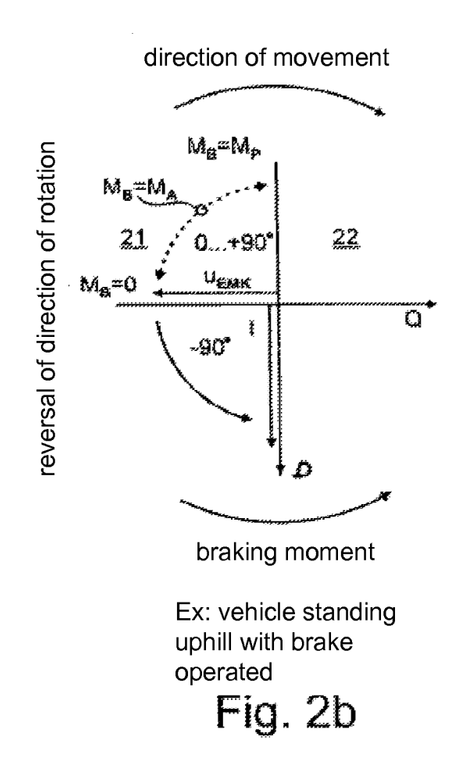

When the speed passes zero, i.e. when the sign is changed, the direction of the $U_{EMK}$ vector (FIG. 2b) changes as well, and the following actions are carried out:

Upon detection of a direction reversal or a speed v of the moving part of approximately zero, a transition to a holding mode takes place in which the current vector I of the electric stator system of the machine is adjusted such that, at the beginning of the holding mode, an effective internal moment $M_B$ of the machine is formed that is reduced with respect to the deceleration moment M. The current vector I is adjusted in this manner until, with movement of the moving part and influence of an external moment $M_A$ acting on the machine, a stable equilibrium of moments between external moment $M_A$ and internal moment $M_B$ of the machine is obtained.

In particular, in the present case the current vector I is adjusted in mathematically positive direction, i.e. counterclockwise, so as to be electrically rotated by 90° and thus establish a phase position of −90° electrical in relation to the new direction of movement of the voltage induced. To this end, the amount of the current vector is kept constant and the phase angle is changed accordingly. The amount of the current vector I is determined by the intensity of operation of the brake pedal. The moment effective at maximum in a specific position of the brake pedal is M. The phase position between the vectors has the result that the moment immediately goes towards zero along with the switching operation. When all external moments are zero at this moment of time, the vehicle reaches a standstill.

The new position of the current vector I is frozen, i.e. the converter 3 is controlled by the control means 5 (FIG. 1) such that the current vector I remains at the same position with respect to the stator. To this end, the presently existing resolver angle is stored. In the braking-to-standstill state, all calculations are carried out on the basis of the stored resolver angle and in consideration of a 90° phase rotation. The result hereof in the rotor coordinate system is that, with rotating rotor, the current vector I moves with respect to the fixed voltage vector $U_{EMK}$. When the voltage vector $U_{EMK}$ now moves more and more in the direction of opposition to the current vector I, the braking moment $M_B$ of the machine increases. This may be the case e.g. when the vehicle was moving uphill on a slope and was decelerated on the slope. The vehicle has an energy proportional to the moment of mass inertia, and the slope decelerating force is acting on the vehicle. As the kinetic energy during braking has been converted to other energies, the vehicle, after reaching a standstill, would roll backwards if the slope decelerating force were still present and if there were no braking moment. The maximum value of the moment again would be obtained for the case that current vector I and voltage vector $U_{EMK}$ are located on a straight line.

In the holding mode, the voltage vector $U_{EMK}$ electrically may cover a range from 0° and 180° (M=0), respectively, to 90° (M=$M_P$) without the current vector I in stator coordinates changing its position. When the following holds for all external moments $M_A$ acting on the vehicle: $0<=M_A<=M_P$, a state of equilibrium $M_A=M_B$ results in which the vehicle comes to rest. This behaviour may be compared to a loaded spring balance in which the body to be weighed, as long as the weight thereof does not exceed the measuring range, after a certain spring tensioning distance has reached the state of equilibrium with the spring force of the balance. Due to the fact that the braking range extends between the moment zero and a moment value oriented with respect to the position of the brake pedal, the standstill position of the rotor is dependent upon the intensity of operation of the brake pedal. When the brake moment is not sufficiently high, the rotor will leave the braking-to-standstill range in the new direction of movement. Upon leaving this range, the phase angle of the stator current in rotor coordinates is again held constant, so that a maximum braking effect results for the presently existing current amount. When the amount of the current vector I is increased such that the resulting braking moment exceeds the driving moment, the machine again comes to a standstill.

Thus, on the basis of the embodiment described hereinbefore, the following general control of the synchronous machine results according to the invention:

The amplitude of the current vector I is proportional to a currently demanded deceleration moment (braking moment) $M_B$, wherein the moving part current, assuming a moving part coordinate system D, Q in which on the assumption of a positive direction of movement of the moving part, the space vector of the induced moving part voltage $U_{EMK}$ is oriented in positive direction of the real axis Q, is impressed at the beginning of the holding mode such that a phase position of the current vector I results which is approximately −90° electrical in relation with respect to the space vector of the induced moving part voltage $U_{EMK}$.

Assuming a moving part coordinate system D, Q in which on the assumption of a negative direction of movement of the moving part, the space vector of the induced moving part voltage $U_{EMK}$ is oriented in the negative direction on the real axis Q, the current vector I at the beginning of the holding mode is impressed such that a phase position of the current vector I of approximately −90° electrical in relation to the direction of movement of the space vector of the induced moving part voltage $U_{EMK}$ results after standstill.

The current vector I is impressed in the holding mode in stator coordinates over a first range 21 of an angle of movement of the voltage vector $U_{EMK}$ of from 0° to 90° electrical in relation to its direction of movement after standstill with a substantially constant phase position in relation to the coordinate system. Upon renewed detection of a direction reversal or a speed v of the moving part of approximately zero, such that the original direction of movement of the moving part is resumed, the already effectively impressed current vector I in stator coordinates is maintained over a second range 22 of an angle of movement of the voltage vector $U_{EMK}$ of from 0° to 90° electrical in relation to the updated direction of movement after standstill with a substantially constant phase position with respect to the coordinate system.

The impressing of the current vector I, which is predetermined in the holding mode, is terminated when the electric angle of movement of the moving part exceeds the first or second range 21, 22 of an angle of movement under the influence of an external moment $M_A$ that is greater than the internal moment $M_B$ of the machine in the not mutually adjacent marginal regions of the first and second range 21, 22 of an angle of movement, respectively, in a direction in which neither the first (21) nor the second range 22 of an angle of movement is located. Upon exceeding the first and second ranges 21, 22 of an angle of movement, respectively, the induced moving part voltage $U_{EMK}$ and the current vector I are adjusted relative to each other such that, upon continued moving part movement of the machine, a generator-mode of operation with constant moment according to a presently existing demand takes place, as it took place before the transition to the holding mode.

Figure 2C:
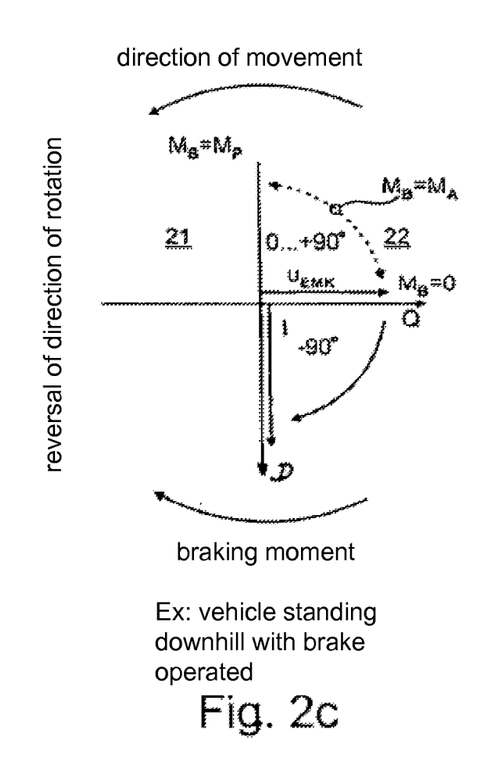

When the direction of the moment acting on the vehicle from the outside reverses so that the voltage vector $U_{EMK}$ is moved again to a position with a 90° phase shift with respect to current vector I (zero moment), the first braking-to-standstill range is left (FIG. 2c). Detection of the actual reversal of the direction of rotation again activates the braking-to-standstill operation, with the current and voltage vectors I and $U_{EMK}$ being adjusted as shown in FIG. 2c. Thus, directly after the reversal of the direction of rotation, the braking moment is zero, and the vehicle moves due to slow further rotation up to a point where the accelerating moment and the braking moment are in equilibrium. As long as the external moment $M_A$ does not exceed the presently maximum braking moment $M_P$, as can be seen from FIGS. 2b and 2c, changing between both braking quadrants 21 and 22 is possible without the current vector I changing its direction in stator coordinates. Thus, the current controller 7 is not subject to high dynamic requirements. With respect to the voltage vector $U_{EMK}$ and the presently existing direction of rotation, the current I is always trailing by 90° immediately to the reversal of the direction of rotation. When the rotor moves, the current may remain constant.

When the external moment becomes greater than the moment predetermined by way of the brake pedal, the operation leaves the holding range in the direction in which the external moment is active. Upon leaving of the holding range, current vector I and voltage vector $U_{EMK}$ again are arranged in opposition to each other and, as of leaving of the braking-to-standstill range, are guided towards each other in this position. To this end, the rotor position is permanently updated again as of exceeding of the range limit.

As demonstrated by the preceding explanations, the vehicle remains in the braking state over 180° of the electrical period. Assuming that the direction of the external effective moment does not change permanently and that the braking moment is set in advance with a sufficiently high value, after the moment of time of the reversal of the direction of rotation there has to be expected a maximum of one movement over 90° electrically until the vehicle comes to rest. In consideration of the number of pole pairs P present in the electric machine and the possibly downstream transmission system with a speed reduction of N, a movement over a mechanical angle of at the most $$\partial_{mech} = 90°/(P \cdot N)$$

has to be reckoned with. Due to the fact that high-torque drive machines preferably are designed with pole pair numbers P greater than 13, the distance covered until standstill of the machine is negligible.

Standstill control in Cartesian coordinates:

The current position often is not determined by the amount and the angle of the current, but by the active and reactive components of the same. As in case of using polar coordinates, the resolver position is frozen upon detection of the reversal of the direction of rotation. The necessary rotation of the current angle with respect to the stored angle position is not only achieved by switching an angle offset, but by exchange of the target values for active and reactive current with the correct sign. This means that the moment value set by way of the brake pedal is used as target value of the reactive current.

Figure 3A:
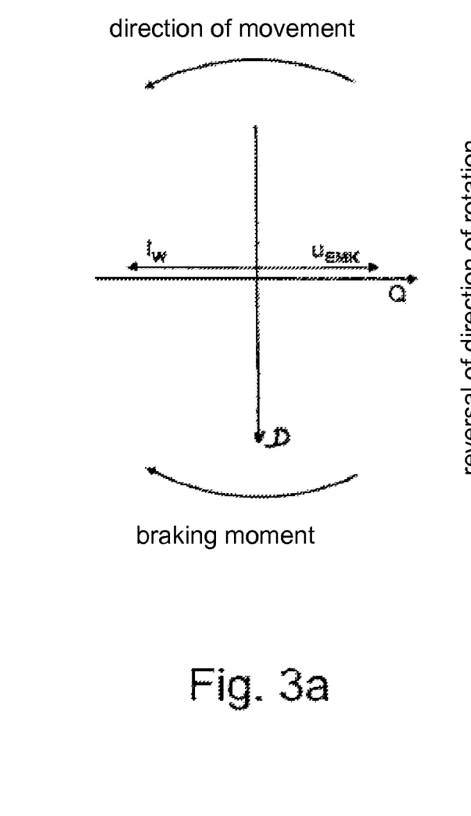
FIG. 3 is an additional schematic illustration of electric variables in a locking mode according to the invention, as generated by the induction machine or control system according to FIG. 1, in a space vector representation.
Figure 3B:
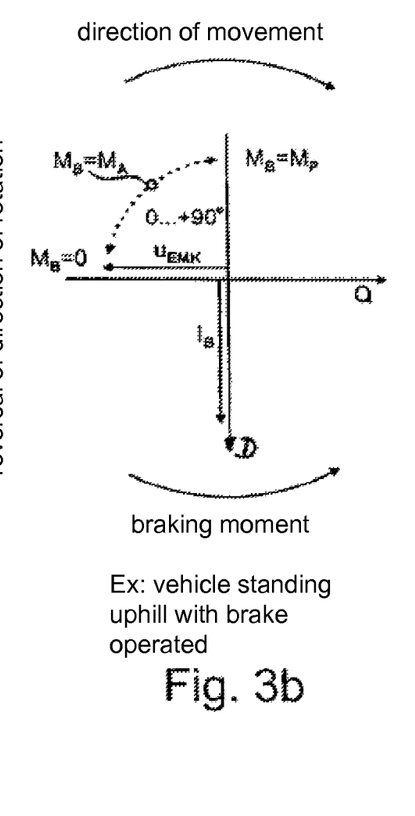
Figure 3C:
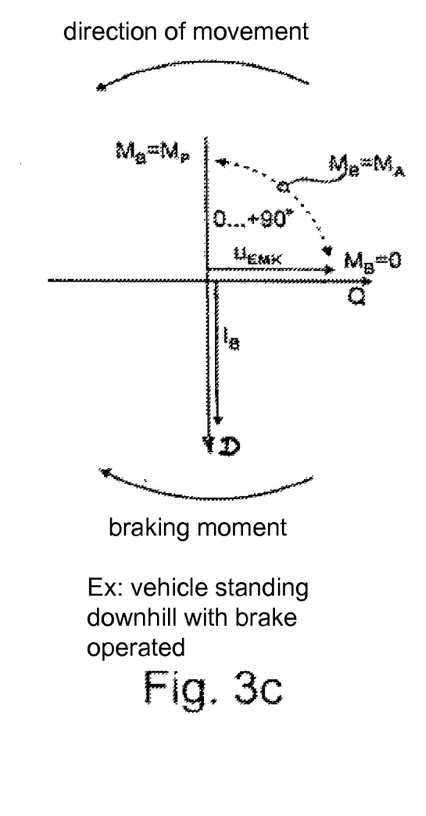

It is assumed that a vehicle is moving in positive direction so that currents and induced voltage behave as indicated in FIG. 3a. The vehicle is moving uphill. As of initiation of a braking operation, the speed of the vehicle is reduced such that the speed zero is reached. Thereafter, the direction of movement is reversed due to the slope deceleration force. By way of the change in sign of the speed, the braking-to-standstill operation is started (FIG. 3b), and the vehicle moves in a state of equilibrium existing between active braking moment and slope deceleration moment acting on the vehicle. If this state of equilibrium is not found as the brake pedal is not depressed sufficiently enough, the vehicle moves on in the direction of movement shown in FIG. 3a. Upon exceeding the braking-to-standstill range, changing over to the current resolver signal is effected, and the active current is activated instead of the reactive current (FIG. 3b). In case the direction of rotation changes again, the system changes to a state according to FIG. 3c. The behaviour is identical in using polar and Cartesian coordinates; there is merely a different control scheme employed.

Standstill control in stator coordinates:

In case of control of the synchronous machine in stator coordinates, the controller has to operate with alternating magnitudes of the stator current. This is why an alternating quantity is used as setting value as well. When braking-to-standstill is activated by a reversal of the direction of rotation, there is also activated a current pattern reducing the effective moment to the value zero at the time of activation. This pattern is kept constant as long as the moving part moves in the braking-to-standstill range.

Figure 4A:
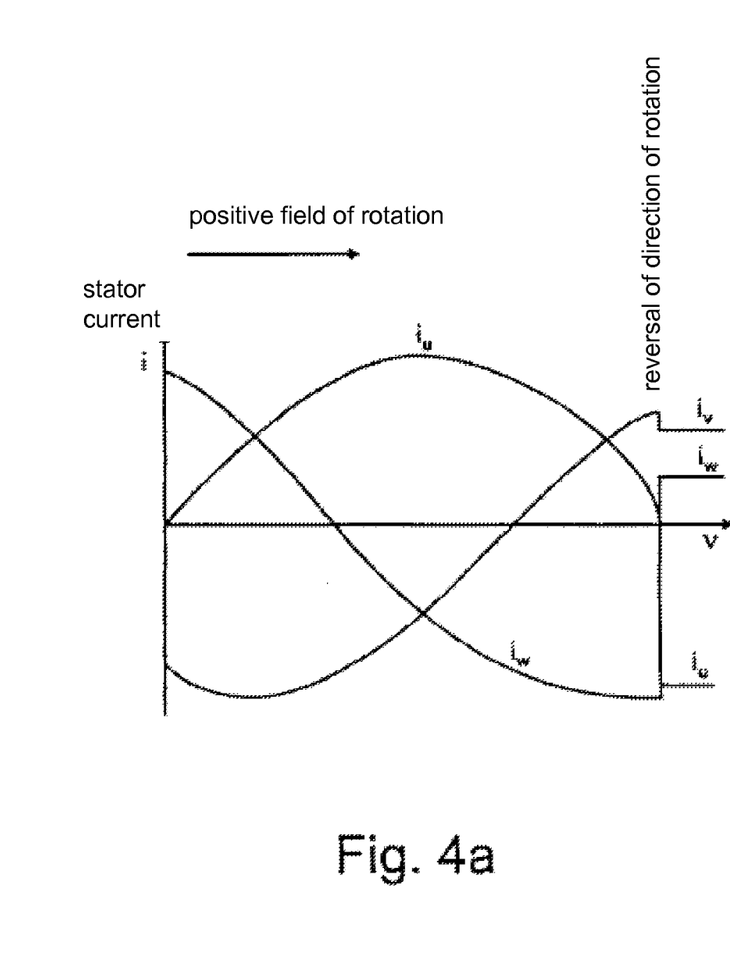
FIG. 4 is a schematic illustration of actual values of corresponding stator string currents.
Figure 4B:
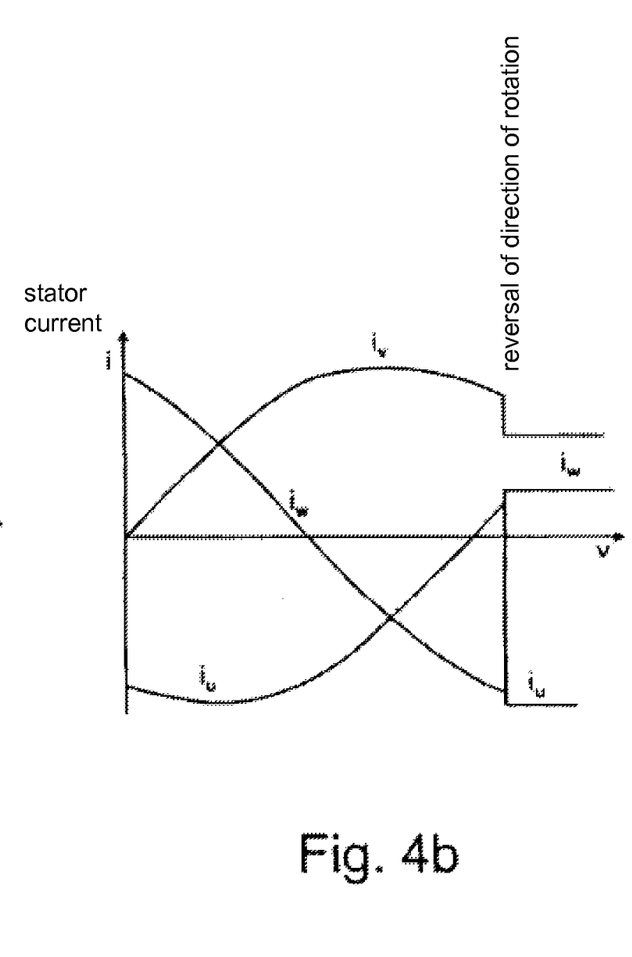

The representations of FIG. 4 show the current curves of a synchronous induction machine that is decelerated from different directions of movement each and changes over to braking-to-standstill at the same mechanical position. Due to the fact that the transition to braking-to-standstill takes place at the same location, the same pattern of constant currents results therefrom as well. The patterns illustrated in FIGS. 4a, 4b would also result when the rotor coordinate system is applied.

In summary, a specific pattern of constant currents is impressed in the coils of the machine in the holding mode, with this pattern being defined solely by the rotor position valid during the speed zero and by a maximum braking force setting active at that time, as it may be effected by a brake pedal, so that neither a superimposed rotor position control nor a superimposed rotor speed control are necessary. In this regard, the holding mode covers an electrical range of ±90° as of the angle that is the presently existing angle when the speed zero is reached.

The control of the stator currents may take place in polar or Cartesian rotor coordinates or in stator coordinates. When the current control takes place in polar rotor coordinates, the target value of the current vector I is defined by setting the phase angle to −90° electrical in relation of the direction of movement of the vector of the induced voltage, while the position of the brake pedal sets the amount of the vector. When the current control takes place in Cartesian coordinates, the current target value is defined during braking-to-standstill in that the active current value is set to zero and reactive current value is set to a value proportional to the position of the brake pedal.

When the current control takes place in rotor coordinates, the three phase current target values are shifted electrically by +90° (braking from positive direction of rotation) or by −90° (braking from negative direction of rotation) upon occurrence of braking-to-standstill, so that there is again resulting an angle of −90° electrical in relation to the presently existing direction of movement of the voltage induced.

After reversal of the external moment, new zero-crossing of the speed may take place, so that the original direction of movement is resumed and the zero-crossing leads to a change into the second braking-to-standstill quadrant without causing the current vector already effective in the first braking-to-standstill quadrant to change its direction; the position of the current vector again can be defined as outlined hereinbefore.

Leaving of the braking-to-standstill quadrants takes place when the external force exceeds the maximum effective braking force within the braking-to-standstill quadrants, and directly in exceeding the range limits the vector of the induced voltage $U_{EMK}$ of the machine and the braking current I are in direct opposition to each other and the resolver angle again is permanently updated so that starting from this the operation in the generator-mode, with constant moment or constant force, respectively, takes place as is characteristic for a conventional braking operation.

The invention claimed is:

1. A method of controlling an electric synchronous machine having a stator and a moving part, said method comprising the following steps:
operating the machine with a deceleration moment ($M_D$) so that a speed of the moving part of the machine is reducing,
monitoring the movement of the moving part of the machine,
transitioning to a holding mode upon detection of a direction reversal or a speed (v) of the moving part of approximately zero by impressing at least one current pattern (I; $i_u$, $i_v$, $i_w$) of string currents in the stator of the machine, wherein, in the holding mode, a phase position of the current pattern (I; $i_u$, $i_v$, $i_w$) with respect to a coordinate system of the stator system is held substantially constant, and wherein the current pattern forms a current vector (I) in space vector representation of a moving part coordinate system (D, Q), the amplitude of which is proportional to a currently demanded deceleration braking moment ($M_B$), and which at the beginning of the holding mode is impressed such that a phase position of the current vector (I) of approximately −90° electrical in relation to the direction of movement of the space vector of the induced moving part voltage ($U_{EMK}$) is obtained after standstill, and thus an effective braking moment ($M_B$) of the machine becomes approximately zero, and maintaining the current pattern (I; $i_u$, $i_v$, $i_w$) until, with movement of the moving part and influence of an external moment ($M_A$) acting on the machine, a stable equilibrium of moments between the external moment ($M_A$) and the braking moment ($M_B$) of the machine is established.

2. A method according to claim 1, wherein phase position and amount of the current pattern (I; $i_u$, $i_v$, $i_w$) are adjusted in defined manner by a moving part position of the machine that is valid during direction reversal or the speed zero, respectively, and by a deceleration moment setting.

3. A method according to any one of claim 1, wherein the current pattern forms a current vector (I) in space vector representation, the amplitude of which is proportional to a currently demanded deceleration moment ($M_B$) and which, assuming a moving part coordinate system (D, Q), in which on the assumption of a positive direction of moment of the moving part, the space vector of the induced moving part voltage ($U_{EMK}$) is oriented in positive direction on the real axis (Q), is impressed at the beginning of the holding mode in such a manner that a phase position of the current vector (I) of approximately −90° electrical in relation to the direction of movement of the space vector of the induced moving part voltage ($U_{EMK}$) is reached.

4. A method according to claim 3, wherein the current pattern forms a current vector (I) in space vector representation, the amplitude of which is proportional to a currently demanded deceleration moment ($M_B$) and which, assuming a moving part coordinate system (D, Q), in which on the assumption of a negative direction of moment of the moving part, the space vector of the induced moving part voltage ($U_{EMK}$) is oriented in negative direction on the real axis (Q), is impressed at the beginning of the holding mode in such a manner that a phase position of the current vector (I) of approximately −90° electrical in relation to the direction of movement of the space vector of the induced moving part voltage ($U_{EMK}$) is reached after standstill.

5. A method according to claim 1, wherein the current pattern forms a current vector (I) in space vector representation, the amplitude of which is proportional to a currently demanded deceleration moment ($M_B$) and which, assuming a moving part coordinate system (D, Q), in which on the assumption of a negative direction of moment of the moving part, the space vector of the induced moving part voltage ($U_{EMK}$) is oriented in negative direction on the real axis (Q), is impressed at the beginning of the holding mode in such a manner that a phase position of the current vector (I) of approximately −90° electrical in relation to the direction of movement of the space vector of the induced moving part voltage ($U_{EMK}$) is reached after standstill.

6. A method according to claim 1, wherein the current pattern (I; $i_u$, $i_v$, $i_w$) in the holding mode is impressed over a first range of an angle of movement of the moving part of from 0 to 90° electrical in relation to the direction of movement thereof after standstill, having a substantially constant phase position with respect to the coordinate system.

7. A method according to claim 6, wherein, upon renewed detection of a direction reversal or a speed (v) of the moving part of approximately zero, so that the original direction of movement of the moving part is resumed, the already effectively impressed current pattern (I; $i_u$, $i_v$, $i_w$) is maintained over a second range (22) of an angle of movement of the moving part of from 0 to 90° in relation to the updated direction of movement after standstill with a substantially constant phase position with respect to the coordinate system.

8. A method according to claim 6, wherein the
impression of the current pattern (I; $i_u$, $i_v$, $i_w$) set in the holding mode is terminated when the electric angle of movement of the moving part exceeds the first or second range (21, 22) of the angle of movement under the influence of an external moment ($M_A$) that is greater than said internal moment ($M_B$) of the machine in the not mutually adjacent marginal zones of the first and second range (21, 22) of the angle of movement, respectively, in a direction in which neither the first (21) nor the second range (22) of the angle of movement is located, wherein, after exceeding the first and second range (21, 22) of the angle of movement, respectively, the induced moving part voltage ($U_{EMK}$) and the current pattern (I; $i_u$, $i_v$, $i_w$) are adjusted relative to each other such that, with continued moving part movement of the machine, an operation in the generator mode with constant moment according to an presently existing demand takes place as it took place before the transition to the holding mode.

9. A method according to claim 1, wherein phase position and amount of the current pattern (I; $i_u$, $i_v$, $i_w$) are adjusted in defined manner by a moving part position of the machine that is valid during direction reversal or the speed zero, respectively, and by a deceleration moment setting.

10. A method according to claim 1, wherein, as the current pattern (I; $i_u$, $i_v$, $i_w$) is impressed in the stator of the machine in particular a pattern of substantially constant string currents ($i_u$, $i_v$, $i_w$).

11. A method according to claim 1, wherein the current pattern forms a current vector (I) in space vector representation, the amplitude of which is proportional to a currently demanded deceleration moment ($M_B$) and which, assuming a moving part coordinate system (D, Q), in which on the assumption of a positive direction of moment of the moving part, the space vector of the induced moving part voltage ($U_{EMK}$) is oriented in positive direction on the real axis (Q), is impressed at the beginning of the holding mode in such a manner that a phase position of the current vector (I) of approximately −90° electrical in relation to the direction of movement of the space vector of the induced moving part voltage ($U_{EMK}$) is reached.

12. A method according to claim 1, wherein the current pattern forms a current vector (I) in space vector representation, the amplitude of which is proportional to a currently demanded deceleration moment ($M_B$) and which, assuming a moving part coordinate system (D, Q), in which on the assumption of a negative direction of moment of the moving part, the space vector of the induced moving part voltage ($U_{EMK}$) is oriented in negative direction on the real axis (Q), is impressed at the beginning of the holding mode in such a manner that a phase position of the current vector (I) of approximately −90° electrical in relation to the direction of movement of the space vector of the induced moving part voltage ($U_{EMK}$) is reached after standstill.

13. A method according to claim 1, wherein the electric supply variable (I; $i_u$, $i_v$, $i_w$) in the holding mode is impressed over a first range (21) of an angle of movement of the moving part of from 0 to 90° electrical in relation to the direction of movement thereof after standstill, having a substantially constant phase position with respect to the coordinate system.

14. A control system for controlling an electric synchronous machine, comprising a control means adapted to be connected to an electric supply means for supplying current to an electric stator system of the machine and in which a method according to claim 1 is implemented.

15. A vehicle comprising at least one electric synchronous machine for powering the vehicle and comprising a control system according to claim 14 or controlling the synchronous machine.

16. A computer program product comprising software code sections that are suitable for performing a method according to claim 1 when these are stored in a control system for controlling an electric synchronous machine.

17. A connection-programmed circuit that is suitable for performing a method according to claim 1 when it is implemented in a control system for controlling an electric synchronous machine.

* * * * *